United States Patent [19]

Dexter et al.

[11] Patent Number: 5,029,953
[45] Date of Patent: Jul. 9, 1991

[54] ULTRAVIOLET OPTICAL ISOLATOR UTILIZING THE KDP-ISOMORPHS

[75] Inventors: James L. Dexter; John F. Reintjes, Jr., both of Alexandria, Va.; Joseph E. Landry, Clifton Park, N.Y.; David G. Cooper, Riva, Md.

[73] Assignee: The United States of America as represented by the Secretary of the Navy, Washington, D.C.

[21] Appl. No.: 597,847

[22] Filed: Oct. 17, 1990

[51] Int. Cl.$^5$ ............................................. G02F 1/09
[52] U.S. Cl. ................................. 350/1.1; 252/588; 350/378; 350/390; 372/703
[58] Field of Search ................. 350/1.1, 375, 376, 377, 350/378, 390; 252/588; 372/703

[56] References Cited

U.S. PATENT DOCUMENTS

| | | | |
|---|---|---|---|
| 3,663,087 | 5/1972 | Guillet et al. | 350/376 |
| 3,675,125 | 7/1972 | Jaeckun | 350/377 |
| 3,757,247 | 9/1973 | Giallorenzi et al. | 372/94 |
| 4,059,759 | 11/1977 | Harney et al. | 350/377 |
| 4,196,396 | 4/1980 | Smith | 350/393 |
| 4,804,256 | 2/1989 | Wilson | 350/376 |

Primary Examiner—Bruce Y. Arnold
Assistant Examiner—Martin Lerner
Attorney, Agent, or Firm—Thomas E. McDonnell; George Jameson

[57] ABSTRACT

An ultraviolet optical isolater which utilizes a KDP-isomorph crystal as the optical element is disclosed. In a preferred embodiment, the ultraviolet optical isolator comprises: an input polarizer for linearly polrizing an input beam of ultraviolet light in a first plane of polarization; means for rotating the plane of polarization of the linarly polarized ultraviolet light from the input polarizer by substantially 45 degrees in a first direction; a Faraday rotator including an optical element made of a KDP-isomorph crystal in which the plane of polarization of the rotated linearly polarized ultraviolet light from the rotating means is rotated about an optical axis of the optical element, a plurality of permanent magnets sequentially coupled together with altnerating polarities for developing a magnetic field along the optical axis of the optical element in order to cause the optical element to rotate the plane of polarization of the rotated linearly polarized ultraviolet light from the rotating means by substantially another 45 degrees in the first direction to a second plane of polarization substantially orthogonal to the first plane of polarization, and means for moving the optical element so that the optical element is always enclosed by the plurality of permanent magnets; and an output polarizer for outputting the ultraviolet light in the second plane of polarization.

11 Claims, 1 Drawing Sheet

ULTRAVIOLET OPTICAL ISOLATOR UTILIZING THE KDP-ISOMORPHS

BACKGROUND OF THE INVENTION

1. Field of the Invention

This invention relates to optical isolators and particularly to an ultraviolet optical isolator which utilizes a KDP-isomorph for rotating the polarization of ultraviolet radiation in the wavelength range from about 190 to about 350 nanometers (nm).

2. Description of the Prior Art

Optical isolators using Faraday rotators have many uses in laser technology, such as for isolating stages of oscillator-amplifier systems and for discriminating against reverse-traveling waves in ring cavities. A Faraday rotator is a device that rotates the angle of polarization of light by using the Faraday effect. The Faraday effect is a magneto-optic effect wherein a magnetic field applied to a Faraday material causes the axis of polarization of the linearly polarized light to rotate. Faraday rotators have not been used extensively in the ultraviolet (UV) because of the limited availability of suitable Faraday materials. The two most important characteristics of a Faraday material are the ability of the Faraday material to rotate the polarization of light when the material is placed in a magnetic field, as indicated by the Verdet constant, V, of the Faraday material, and the optical transmission of the Faraday material at the wavelength of interest. The Verdet constant of a Faraday material is a function of wavelength. The optical transmission of the material is also dependent upon the wavelength. In general, Faraday materials with large Verdet constants have large absorption in the UV, while Faraday materials with high UV transmission have relatively small Verdet constants.

In the known prior art, only water and fused silica have been used in the UV as Faraday rotators. Water has been used in the UV as a Faraday material for XeCl and KrF lasers at 308 and 248 nanometers (nm), respectively. Water is suitable for large pulsed oscillator-amplifier systems, where a long path and strong pulsed magnetic fields can be used. However, the relatively small Verdet constant of water at these wavelengths makes it a less desirable Faraday material for small lasers where space may be limited. In addition, unless the water is kept extremely pure, its optical quality degrades severely. Sources of contamination of the water range from the leaching of chemicals from container walls to algae growth.

Fused silica has been used in the UV as a Faraday rotator with the KrF laser operating at 248 nm. The Verdet constant of various types of fused silica have been measured at visible wavelengths. The values for the various types of fused silica are in agreement with each other to within approximately 10%. However, the only reported measurement in the UV is for a specific type of fused silica, suprasil, at 253.7 nm. In general, values of the Verdet constant at UV wavelengths can be predicted, for a given material, by applying a simple scaling relation to measured values of the Verdet constant at visible wavelengths. This scaling relation has an inverse-square dependence on wavelength, so its value increases as the wavelength gets shorter.

For fused silica, from measured values of V in the visible, the scaling relation predicts Verdet constants of 1365 deg/T-m at 253.7 nm and 1430 deg/T-m at 248 nm. However, measured values of 1710 deg/T-m at 253.7 and 1920 deg/T-m at 248 nm have been reported for suprasil and for an unspecified type of fused silica, respectively. The discrepancy of 25-30% between the predicted and measured values is most likely due to the type and relative abundance of impurities present in the fused silica, and indicates that the UV Verdet constants of the various types of fused silica and even of different batches of the same type may be very sensitive to small changes in composition. It is well known that different types of fused silica have widely varying optical transmission in the UV due to impurities.

As indicated above, practical Faraday rotators for the UV would find applications with lasers operating at UV wavelengths. Of the two Faraday materials which previously have been utilized in the UV, fused silica has the disadvantages of widely varying composition and insufficient data on the UV Verdet constants to make it widely useful as a Faraday material in the UV, while water has a well-known, but relatively small UV Verdet constant and is easily contaminated. Thus, there is a clear and compelling need for better UV Faraday rotating materials.

OBJECTS OF THE INVENTION

Accordingly, one object of the invention is to provide an optical isolator that is operational in the wavelength range from about 190 to about 350 nm.

Another object of the invention is to provide an improved ultraviolet isolator.

Another object of the invention is to provide an ultraviolet isolator which utilizes a KDP-isomorph crystal as the optical element in a Faraday rotator.

A further object of the invention is to provide an ultraviolet optical isolator which utilizes a KDP-isomorph crystal as the UV Faraday rotating material and a magnet structure comprised of a plurality of permanent magnets sequentially coupled together with alternating polarities for providing a net magnetic field along the optical axis of the UV Faraday rotating crystal.

SUMMARY OF THE INVENTION

These and other objects of the invention are achieved by providing an ultraviolet optical isolator which utilizes a KDP-isomorph as the optical element. The ultraviolet optical isolator comprises: an input polarizer for linearly polarizing an input beam of ultraviolet light in a first plane of polarization; means for rotating the plane of polarization of the linearly polarized ultraviolet light from the input polarizer by substantially 45 degrees in a first direction; a Faraday rotator including an optical element made of a KDP-isomorph crystal in which the plane of polarization of the rotated linearly polarized ultraviolet light from the rotating means is rotated about an optical axis of the optical element, a plurality of permanent magnets sequentially coupled together with alternating polarities for developing a magnetic field along the optical axis of the optical element in order to cause the optical element to rotate the plane of polarization of the rotated linearly polarized ultraviolet light from the rotating means by substantially another 45 degrees in the first direction to a second plane of polarization substantially orthogonal to the first plane of polarization, and means for moving the optical element so that the optical element is always enclosed by the plurality of permanent magnets; and a output polarizer for outputting the ultraviolet light in the second plane of polarization.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
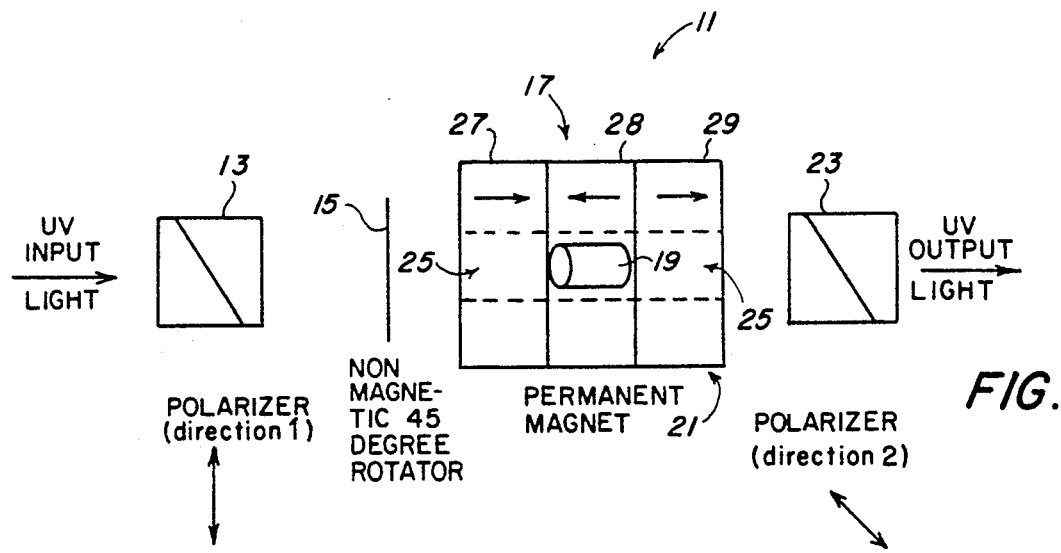
FIG. 1 illustrates a preferred embodiment of the invention.

Referring now to the drawings, FIG. 1 illustrates an ultraviolet optical isolator 11 in conformance with a preferred embodiment of the invention. In general, an optical isolator is an optical device that operationally controls the direction of the polarization of light passing therethrough. The ultraviolet optical isolator 11 of FIG. 1 makes use of the unique polarization rotation properties of a specific class of Faraday materials to control the direction of the polarization of ultraviolet (UV) light passing therethrough.

The ultraviolet optical isolator 11 of FIG. 1 is comprised of an input linear polarizer 13, a 45 degree polarization rotator plate or non-magneto-optic 45 degree rotator 15, a Faraday rotator 17 comprised of an optical element 19 made of a KDP-isomorph crystal and a permanent-magnet magnetic structure 21, and an output linear polarizer 23 that has an axis of polarization that is orthogonal to that of the input linear polarizer 13. Thus, by design, the input linear polarizer 13 has an axis of polarization in a first plane, while the output linear polarizer 23 has an axis of polarization in a second plane which is orthogonal to the first plane.

In operation, ultraviolet light emitted from a light source (not shown), such as a laser, travels from the light source to the input polarizer 13. The input polarizer 13 causes the input ultraviolet light to become linearly polarized with a plane of polarization corresponding to the axis of polarization of the polarizer 13. For purposes of this discussion, assume that the input polarizer 13 linearly polarizes this input light in a first plane of polarization.

The linearly polarized light from the input polarizer 13 then enters the 45 degree polarization rotator 15. The 45 degree polarization rotator 15 rotates the plane of polarization of the linearly polarized ultraviolet light from the input polarizer 13 by substantially 45 degrees in either a counterclockwise (CCW) or clockwise (CW) direction. For purposes of this discussion, assume that the plane of polarization of the linearly polarized light is rotated by substantially 45 degrees in a first direction. The polarization-rotated light from the polarization rotator 15 then enters the optical element 19 of the Faraday rotator 17 along an optical axis (not shown) of the optical element 19.

As will be explained, the Faraday rotator 17 operates to rotate the plane of polarization of the rotated linearly polarized UV light from the 45 degree polarization rotator 15 by substantially another 45 degrees in the first direction. In this manner, the 45 degree polarization rotator 15 and the Faraday rotator 17 operate in combination to provide a total or net of substantially 90 degrees of rotation to the plane of polarization of the linearly polarized light from the input polarizer 13. Thus, the linearly polarized light in the first plane of polarization is rotated by the components 15 and 17 to a second plane of polarization which is orthogonal to the first plane of polarization.

In order for the Faraday rotator 17 to provide this additional 45 degrees of polarization rotation to input UV light or radiation in the exemplary wavelength range from 190 to 350 nanometers (nm), the Faraday rotator 17 must be implemented in a manner different than that utilized in the previously described prior art, as will now be discussed.

The optical element 19 is comprised of a UV Faraday rotating material. The present invention uses a class of nonlinear optical materials, known as the KDP-isomorphs, as UV Faraday rotating materials. KDP-isomorphs are transparent to varying wavelengths in the UV. The use of these KDP-isomorphs is basically directed to achieving optical isolation with operation in the UV. The KDP-isomorphs are tetragonal negative uniaxial crystals belonging to the symmetry class 42m. Due to the anisotropic nature of these crystals, to prevent unwanted polarization effects it is necessary to propagate light along the optic axis of the selected KDP-isomorph crystal. The isomorphs have the general form of $YH_2ZO_4$, wherein Y may be $K^+$ (potassium), $Rb^+$ (rubidium), $Cs^+$ (cesium), $NH_4^+$ (ammonia) or combinations thereof; H (hydrogen) may be replaced by D (deuterium) which is denoted by $D^*$; Z may be P (phosphorus), As (arsenic) or combinations thereof; and O is oxygen.

Examples of the KDP-isomorphs include, but are not limited thereto, potassium dihydrogen phosphate, KDP; deuterated potassium dihydrogen phosphate, $KD^*P$; ammonium dihydrogen phosphate, ADP; deuterated ammonium dihydrogen phosphate, $AD^*P$; potassium dihydrogen arsenate, KDA; deuterated potassium dihydrogen arsenate, $KD^*A$; ammonium dihydrogen arsenate, ADA; deuterated ammonium dihydrogen arsenate, $AD^*A$; rubidium dihydrogen phosphate, RDP; deuterated rubidium dihydrogen phosphate, $RD^*P$; rubidium dihydrogen arsenate, RDA; and deuterated rubidium dihydrogen arsenate, $RD^*A$. Additional isomorphs may be made by partially substituting one alkali for another, e.g. $K_xCs_{1-x}H_2PO_4$, and by having a partially deuterated crystal.

The present inventors have determined that the KDP-isomorphs presently provide the best Faraday materials for use in the UV between 190 and 350 nm. The criteria for judging the suitability of a Faraday material for use as a Faraday rotator are primarily the figure of merit M, which is the ratio of the Verdet constant to the absorption coefficient, the optical quality, and the magnitude and predictability of its Verdet constant.

The magnetic structure 21 surrounds the optical element 19 to provide a magnetic field to the optical element. Preferably, the magnetic structure 21 has an annular cross section or has an aperture or hole 25 bored through the center of the magnetic structure 21 to enable the optical element 19 to be inserted into the magnetic structure.

When a magnetic field is applied to the Faraday material or optical element 19, the optical element 19 will rotate the angle of polarization of light which passes through it. The amount of rotation is determined by three factors: the Verdet constant of the Faraday material, the magnetic field strength in the direction of propagation of the light, and the length of the Faraday material.

The direction of rotation is determined by the sign of the Verdet constant and by the relative direction of the magnetic field and the propagation of the light. Given a material with a positive Verdet constant, and a beam of light propagating in the same direction as the applied magnetic field, the angle of polarization rotates clockwise when viewed along the direction of propagation. If the beam of light is propagating in the direction opposite to the applied magnetic field, the angle of polarization rotates counter clockwise, when viewed along the direction of propagation. The dependence of the direction of polarization rotation on the direction of propagation relative to an applied magnetic field does not occur in any other optical rotation effect, such as the Kerr effect, the Pockel's effect or acoustooptic phase retardation.

The magnetic field is applied parallel to the direction of the optical radiation through the optical element 19. It also must be of sufficient strength to cause a 45 degree rotation of the angle of polarization of the light. The magnetic field may be supplied by either a permanent magnet or by an electromagnet. Because of size and weight considerations, a permanent magnet structure is preferrable over an electromagnet, particularly when miniturization of the system is desirable.

However, a problem arises when a permanent magnet and an optical element 19 of fixed length are utilized. That is, in order to obtain a 45 degree rotation from the Faraday rotator 17, the product of the magnetic field strength of the permanent magnet and the length of the optical element 19 must be adjustable. But both the magnetic field strength and the length of the optical element are fixed. In order to solve this problem, the magnetic field structure 17 should preferably be comprised of at least three permanent magnets 27, 28 and 29, as shown in FIG. 1, so that the net polarization rotation can be adjusted, as will be explained. These magnets can be exemplary rare earth, Nd-Fe-B permanent magnets.

Each of the permanent magnets 27, 28 and 29 in the magnetic field structure 21 can be a block with a hole or aperture 25 bored through the center of the blocks, with the apertures 25 aligned with each other. The permanent magnets 27, 28 and 29 are sequentially coupled together with alternating polarities between adjacent pairs of the magnets 27, 28 and 29. As shown in FIG. 1, magnet 27 has a N-S (north-south) field pointing from left to right, magnet 28 has a N-S field pointing from right to left, and magnet 29 has a N-S field pointing from left to right.

The use of a permanent magnet structure 21 formed by the three permanent magnets 27, 28 and 29, coupled together with alternating polarities, provides a magnetic field that is approximately twice that of a single magnet. The exemplary rare earth permanent magnet structure 21 is preferable over that of electromagnets due to their compactness and ease of use.

For the optimum operation of the Faraday rotator 17, a rotation of 45 degrees is required. Depending on the wavelength under consideration, the values in the following TABLE 1 indicate that a 45 degree rotation can be achieved for one or more of the KDP-isomorphs with crystal lengths of a few centimeters or less at magnetic fields of the order of 0.8T (8 kG), which are obtainable from commercially available rare earth permanent magnets.

TABLE 1

Projected Verdet constants, V, of ultraviolet Faraday rotating materials at several rare gas halide laser wavelengths.

| Material | V (degree/T-m) | | | | |
|---|---|---|---|---|---|
| | Laser λ (nm) | XeF 351 | XeCl 308 | KrF 248 | KrCl 222 | ArF 193 |
| KDP | | 758 | 1030 | 1800 | 2487 | 3875 |
| KD*P | | 877 | 1185 | 2043 | 2795 | 4271 |
| ADP | | 781 | 1061 | 1858 | 2573 | 4023 |
| KDA | | 1465 | 1996 | 3510 | 4878 | 7682 |
| KD*A | | 1589 | 2207 | 4095 | 5958 | 10240 |
| ADA | | 1562 | 2175 | 4058 | 5933 | 10310 |
| Water | | 695 | 969 | 1804 | 2638 | 4839 |
| Crystalline Quartz | | 843 | 1136 | 1923 | 2576 | 3872 |

The alternating polarities of the magnetic fields in the magnetic field structure 21 provide one of the key features of the invention. Under these conditions, the optical element 19 preferably should have a length that is comparable to the length of the inner permanent magnet 28. Also, in order for the Faraday rotator 17 to work properly, the rotation of the polarization should be greater than 45 degrees.

As long as the length of the crystal optical element 19 is sufficient to cause a rotation of greater than 45 degrees in the maximum magnetic field, precise tuning of the rotation angle for optimum isolation can be made. When using the magnetic field structure 21 with the coupled-together permanent magnets 27, 28 and 29, this tuning of the rotation angle may be done by adjusting the position of the optical element 19, that is inside the aperture 25 of the magnetic field structure 17, along the axis of the magnets 27, 28 and 29. The position of the optical element 19 along the composite aperture 25 in the magnetic structure 21 may be set manually using techniques as simple as by pushing the optical element 19 along with a stick (not shown) or by a more complicated means such as the threaded Faraday material holder disclosed in U.S. Pat. No. 4,804,256.

Since the optical element 19 has a length preferably comparable to the length of the inner permanent magnet 28, such means for moving the position of the optical element 19 should result in the optical element partly overlapping the magnet 28 and partly overlapping either one of the adjacent permanent magnets 27 and 29. In this way the net optical rotation produced by the Faraday rotator 17 is the difference between the rotations achieved in the two permanent magnets being partly overlapped. Thus, the net optical rotation can be adjusted anywhere from a maximum optical rotation down to a minimum zero optical rotation. As long as the maximum rotation is greater than 45 degrees, somewhere between the maximum and minimum optical rotations there will be a proper position of the crystal optical element 19 that will produce an optical rotation of 45 degrees.

It is also desirable to select the lengths of the magnets 27, 28 and 29 and the length of the optical element 19 such that the optical element 19 is always contained within the magnetic field structure 21 at all times and for all usable positions of the optical element 19. The reason for this is to minimize the radial non-uniformity of polarization rotation that would be produced by fringing fields if the crystal optical element 19 were to be slid partly out of the magnetic field structure 21.

Because the KDP-isomorph crystals have natural birefringence, the optic axis of the KDP-isomorph crystal (or combination of such crystals) selected as the optical element 19 must be aligned parallel to the direction of propagation of the optical beam applied to the Faraday rotator 17. Therefore, for this class of KDP-isomorph materials the magnetic field from the magnetic field structure 21 must be applied along the optic axis of the crystal optical element 19, which is in turn parallel to the direction of propagation of the optical beam. This arrangement eliminates any polarization rotation due to the birefringence of the crystal optical element 19.

Verdet constants have been measured for several of the KDP-isomorphs at various wavelengths from the visible down to about 365 nm. The results indicate that these materials should have large enough Verdet constants and sufficient optical transmission to make them useful as Faraday isolators for the rare gas halide and other UV lasers, but their suitability for operation with these lasers has not been tested.

Referring back to TABLE 1, the calculated values of the Verdet constants of ADA at 351 nm (XeF) and 308 nm (XeCl) are presented to show the advantages of the KDP-isomorphs over other materials, such as water. Calculated values of the Verdet constants for other KDP isomorphs (such as KDP, KD*P, ADP, KDA, KD*A, ADA) at the wavelengths of the five rare gas halide lasers (XeF, XeCl, KrF, KrCl and ArF) are also presented. Projected Verdet constant values are also presented for crystalline quartz and water based on scaling from previous measurements. The projected Verdet constants for these materials are contained in TABLE 1. The results of the Verdet constant measurements for ADA at 308 and 351 nm are given in the following TABLE 2.

TABLE 2

| Verdet constant and extinction ratio measurements for ADA | | |
|---|---|---|
| λ (nm) | V (deg/T-m) | Extinction Ratio |
| 351 | 1526 | 353:1 |
| 308 | 2328 | 355:1 |

The excellent agreement between the measured and calculated values for ADA indicates that all of the predicted values should be substantially accurate.

Agreement with theory confirms predictions of use for UV lasers. Also included are the measured extinction ratios. This is the degree of attenuation of light traveling in the wrong direction through the optical isolator.

The KDP-isomorphs addressed in TABLE 1 consist of two types of crystals, the arsenates and phosphates. At a given wavelength, the arsenates have larger Verdet constants than the phosphates, as seen in TABLE 1, but have high transmission down to only 260 nm. This makes them good Faraday materials for optical isolators at 351 and 308 nm. At wavelengths shorter than this, the Verdet constants of the phosphates are sufficiently large to construct low transmission loss optical isolators down to 190 nm.

A characteristic that both the arsenates and phosphates share is that they are hygroscopic crystals. This characteristic can result in a long term degradation of the optical quality of the crystals. The exposed surfaces of the crystals will react with the water vapor in room air if they are not kept in a low humidity environment. A fogging of the optical surfaces of the crystals will occur due to the water vapor which will result in increased transmission losses. The problem can be eliminated by enclosing the crystal in a dry cell. The cell may be filled with a dry gas and sealed air tight, or it may be a flowing cell in which a dry gas is used to purge the cell.

The output polarization rotated linear polarized light from the Faraday rotator 17 is applied to the output linear polarizer 23. It has been previously stated that the input linear polarizer 13 and the output linear polarizer 23 have their axes of polarization oriented perpendicular or orthogonal to each other. It also has been previously stated that the 45 degree polarization rotator 15 and the Faraday rotator 17 operate in combination to provide a total or net of substantially 90 degrees of rotation to the plane of polarization of the linearly polarized light from the input linear polarizer 13. Thus, the linearly polarized light in the first plane of polarization is rotated through a substantially 90 degree angle by the components 15 and 17 to a second plane of polarization which is the plane of the axis of polarization of the output linear polarizer 23. As a result, the output linear polarizer 23 passes UV light from the Faraday rotator 17.

Figure 2:
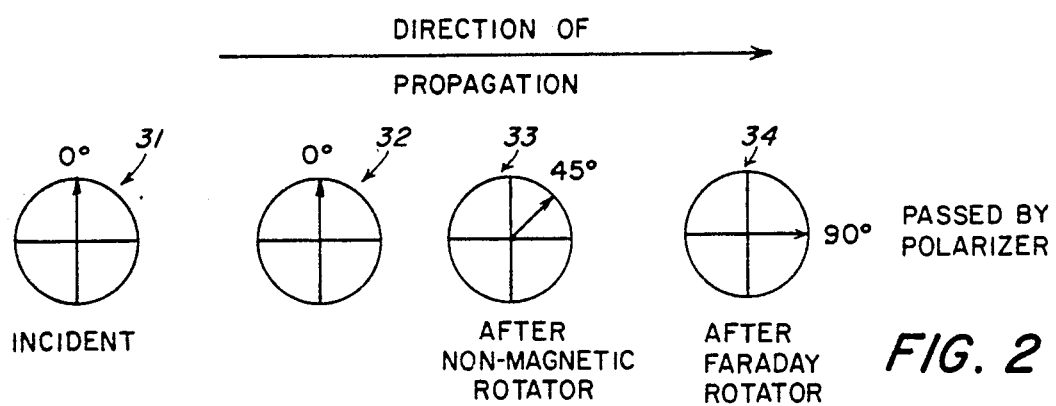
FIG. 2 illustrates representations of changes in the angle of polarization of UV light as it propagates through the optical isolator of FIG. 1 in the forward direction from left to right.
Figure 3:
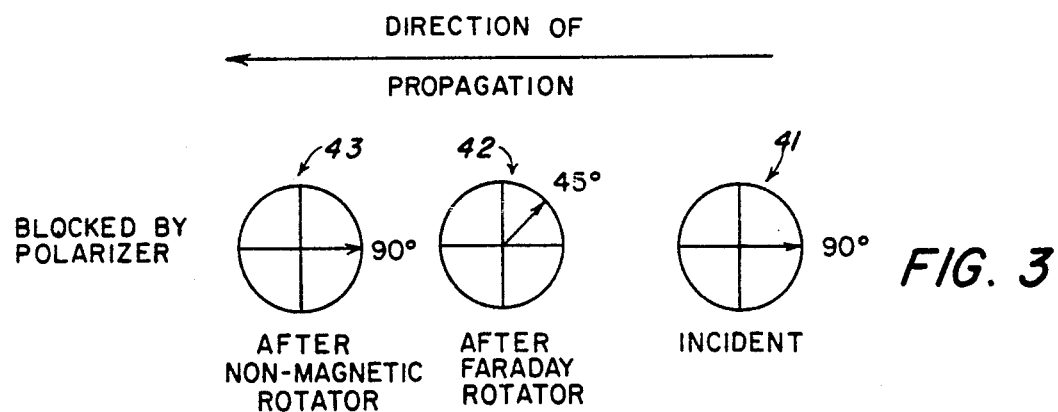
FIG. 3 illustrates representations of changes in the angle of polarization of UV light as it propagates through the optical isolator of FIG. 1 in the backward direction from right to left.

Referring now to FIGS. 2 and 3, the operation of the optical isolator 11 of FIG. 1 with respect to light travelling in the forward and backward directions will now be discussed. The direction of the arrows indicate the direction of the polarizations at various locations in the optical isolator 11.

FIG. 2 illustrates representations of changes in the angle or direction of polarization of UV light as it propagates through the optical isolator of FIG. 1 in the forward direction from left to right.

Polarization representation 31 shows the incident UV input light to the input linear polarizer 13.

Polarization representation 32 shows this light as being linearly polarized at a reference direction of 0 degrees (pointing up) by the input linear polarizer 13. It should be noted that if the incident UV input light is unpolarized, then that portion of the incident UV input light that would be vertically polarized would be passed by the input linear polarizer 13 and subsequently transmitted by the optical isolator 11.

Polarization representation 33 shows the polarization of light after it passes through the 45 degree polarization rotator 15. The polarization of light is shown as being rotated 45 degrees with respect to the plane of FIG. 2. This polarization can be rotated 45 degrees forward out of the plane of FIG. 2 or 45 degrees backward into the plane of FIG. 2.

Polarization representation 34 shows the light after the Faraday rotator 17 rotates the polarization of the light in the same direction as the polarization rotation by the polarization rotator 15. Thus, the net rotation after passing through both the polarization rotator 15 and the Faraday rotator 17 is 90 degrees. This polarization rotation is chosen to be the direction that the output linear polarizer 23 passes.

FIG. 3 illustrates representations of changes in the angle of polarization of UV light as it propagates through the optical isolator 11 of FIG. 1 in the backward direction from right to left.

Polarization representation 41 shows 90 degree polarized light passed by the output linear polarizer 23 back to the Faraday rotator 17.

Polarization representation 42 shows this backward light after the Faraday rotator 17 rotates the polarization of the light by 45 degrees to the left. This rotation will be at 45 degrees to the original direction of the incident light shown in polarization representation 41. However, the rotational sense of that backward light will be opposite to the rotation that it received going through the Faraday rotator 17 in the forward direction.

Polarization representation 43 shows the backward light after it passes through the non-magnetic 45 degree rotator 15. Now the polarization will be rotated 45 degrees in the opposite direction to the direction that it just received from the Faraday rotator 17. Thus, there will be no polarization rotation produced on the backward light by the Faraday rotator 17 and the non-magnetic 45 degree rotator 15. As a result, the backward light from the non-magnetic 45 degree rotator will be blocked by the input linear polarizer 13. Thus, in FIG. 3, when light travels from right to left, vertically (or 0 degrees in FIG. 3) polarized light will be blocked by the output linear polarizer 23, and the 90 degree polarized light (in FIG. 3) will be passed by the output linear polarizer 23 but will be blocked by the input linear polarizer 13. As a result, there will be no light passing through the optical isolator 17 in the backward direction from right to left.

Therefore, what has been described in a preferred embodiment of the invention is an ultraviolet optical isolator which utilizes a KDP-isomorph crystal as the UV Faraday rotating material and a magnet structure comprised of a plurality of permanent magnets sequentially coupled together with alternating polarities for providing a net magnetic field along the optical axis of the UV Faraday rotating crystal.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by letters patent of the U.S. is:

1. An optical isolator comprising:
   an input polarizer for linearly polarizing an input beam of ultraviolet light in a first plane of polarization;
   means for rotating the plane of polarization of said linearly polarized ultraviolet light from said input polarizer by substantially 45 degrees in a first direction;
   a Faraday rotator including:
      an optical element in which said plane of polarization of said rotated linearly polarized ultraviolet light is rotated about an optical axis of said optical element, said optical element being made of a KDP-isomorph crystal;
      a plurality of permanent magnets sequentially coupled together with alternating polarities for developing a magnetic field along said optical axis of said optical element in order to cause said optical element to rotate the plane of polarization of said rotated linearly polarized ultraviolet light from said rotating means by substantially another 45 degrees in said first direction to a second plane of polarization substantially orthogonal to said first plane of polarization; and
   means for moving said optical element so that said optical element is always enclosed by said plurality of permanent magnets; and
   an output polarizer for outputting said ultraviolet light in said second plane of polarization.

2. The optical isolator of claim 1 wherein:
   said rotating means is a non-magnetic 45 degree rotator.

3. The optical isolator of claim 1 wherein said KDP-isomorph crystal has a composition in the general form of $YH_2ZO_4$ wherein:
   Y is selected from the group consisting of potassium, rubidium, cesium, ammonia and combinations thereof;
   H is selected from the group consisting of hydrogen and deuterium;
   Z is selected from the group consisting of phosphorus, arsenic and combinations thereof; and
   O is oxygen.

4. The optical isolator of claim 1 wherein:
   said KDP-isomorph crystal is selected from the group consisting of potassium dihydrogen phosphate, deuterated potassium dihydrogen phosphate, ammonium dihydrogen phosphate, deuterated ammonium dihydrogen phosphate, potassium dihydrogen arsenate, deuterated potassium dihydrogen arsenate, ammonium dihydrogen arsenate, deuterated ammonium dihydrogen arsenate, rubidium dihydrogen phosphate, deuterated rubidium dihydrogen phosphate, rubidium dihydrogen arsenate, and deuterated rubidium dihydrogen arsenate.

5. The optical isolator of claim 1 wherein:
   said KDP-isomorph crystal is an anisotrophic crystal.

6. The optical isolator of claim 1 wherein:
   each of said plurality of permanent magnets is a rare earth permanent magnet.

7. The optical isolator of claim 1 wherein: said plurality of permanent magnets is comprised of at least three permanent magnets.

8. The optical isolator of claim 7 wherein:
   each of said at least three permanent magnets is a rare earth permanent magnet.

9. The optical isolator of claim 1 wherein:
   said plurality of permanent magnets respectively have centrally located apertures aligned with each other along said optical axis of said optical element; and
   said optical element is disposed in said apertures of said plurality of permanent magnets and is subjected to the net magnetic field produced in said optical element by said plurality of permanent magnets.

10. The optical isolator of claim 9 wherein:
    said optical element has a length that is less than the total length of said plurality of permanent magnets and is always within the net magnetic field produced by said plurality of permanent magnets; and
    said moving means has the capability of moving said optical element within said apertures in said plurality of permanent magnets to enable said Faraday rotator to produce a net optical rotation of said rotated linearly polarized ultraviolet light from said rotating means that can be varied between 0 degrees and a maximum of greater than 45 degrees as a function of the position of said optical element within the apertures of said plurality of permanent magnets.

11. The optical isolator of claim 1 wherein:
    said optical element rotates the polarization of ultraviolet radiation in the wavelength range from 190 to 350 nm.

* * * * *